United States Patent
Abe et al.

(10) Patent No.: US 11,504,960 B2
(45) Date of Patent: Nov. 22, 2022

(54) METHOD FOR PRODUCING LAMINATE

(71) Applicant: SIKA HAMATITE CO., LTD., Hiratsuka (JP)

(72) Inventors: Megumi Abe, Hiratsuka (JP); Yuichi Matsuki, Hiratsuka (JP)

(73) Assignee: Sika Hamatite Co., Ltd., Kanagawa (JP)

( * ) Notice: Subject to any disclaimer, the term of this patent is extended or adjusted under 35 U.S.C. 154(b) by 301 days.

(21) Appl. No.: 16/762,014

(22) PCT Filed: Nov. 7, 2018

(86) PCT No.: PCT/JP2018/041356
§ 371 (c)(1),
(2) Date: May 6, 2020

(87) PCT Pub. No.: WO2019/093380
PCT Pub. Date: May 16, 2019

(65) Prior Publication Data
US 2020/0353740 A1 Nov. 12, 2020

(30) Foreign Application Priority Data

Nov. 10, 2017 (JP) .............................. JP2017-217110

(51) Int. Cl.
| | | |
|---|---|---|
| *B32B 27/00* | (2006.01) | |
| *B32B 38/16* | (2006.01) | |
| *B08B 1/00* | (2006.01) | |
| *B08B 3/08* | (2006.01) | |
| *B32B 7/12* | (2006.01) | |
| *B32B 27/08* | (2006.01) | |
| *B32B 37/12* | (2006.01) | |
| *B32B 38/00* | (2006.01) | |
| *C08J 5/12* | (2006.01) | |
| *C08J 7/12* | (2006.01) | |
| *C11D 7/32* | (2006.01) | |
| *C11D 7/50* | (2006.01) | |
| *B23B 27/00* | (2006.01) | |

(52) U.S. Cl.
CPC ............ *B32B 38/162* (2013.01); *B08B 1/006* (2013.01); *B08B 3/08* (2013.01); *B32B 7/12* (2013.01); *B32B 27/08* (2013.01); *B32B 37/12* (2013.01); *B32B 38/0008* (2013.01); *C08J 5/128* (2013.01); *C08J 7/123* (2013.01); *C11D 7/3209* (2013.01); *C11D 7/50* (2013.01); *B32B 2310/14* (2013.01); *C08J 2323/12* (2013.01)

(58) Field of Classification Search
CPC ....................................................... B32B 37/00
USPC ........................................................ 428/447
See application file for complete search history.

(56) References Cited

U.S. PATENT DOCUMENTS

2020/0362212 A1* 11/2020 Larsson ............... C09D 171/00

FOREIGN PATENT DOCUMENTS

| EP | 0 372 756 A2 | 6/1990 |
|---|---|---|
| EP | 2 336 260 A1 | 6/2011 |
| JP | 09-003221 A | 1/1997 |
| JP | H09-048863 A | 2/1997 |
| JP | 2004-224914 A | 8/2004 |
| JP | 2010-150373 A | 7/2010 |

OTHER PUBLICATIONS

Extended European search report, becoming known to applicant dated Sep. 22, 2021, issued in the corresponding European Patent Application No. 18875410.5.
Seki, Daisuke, Surface modification technology for film by atmospheric pressure plasma, Technology of Adhesion, pp. 24-28, vol. 36, No. 3, the 124th volume, published on the last day of Dec. 2016, published by The Adhesion Society of Japan, and its English translation.
Office Action, a Decision of Rejection, issued to the corresponding Chinese Patent Application No. 201880071604.1.
Yinhe Jin, "Flexographic Printing", Chemical Industry Press, Beijing, with a partial English translation thereof.
"Handbook of Rubber Industry Materials and Equipments", 2016 Edition, by the Editorial Committee of the Handbook of Rubber industry Materials and Equipments, with a partial English translation thereof.
Office Action, a Decision of Rejection, dated Aug. 2, 2022, issued to the corresponding Chinese Patent Application No. 201880071604.1.
Yinhe Jin, "Flexographic Printing", Chemical Industry Press, Beijing, May 2001, with a partial English translation thereof.

* cited by examiner

*Primary Examiner* — Gregory E Webb
(74) *Attorney, Agent, or Firm* — Carrier Blackman & Associates, P.C.

(57) ABSTRACT

The present invention is to provide a method for producing a laminate having excellent adhesion properties. An embodiment of the present invention is a method for producing a laminate, the method including: a step 1 of dry-treating a surface A of a plastic to obtain a dry-treated plastic having a surface B that has been dry-treated; a step 2 of wiping the surface B with a cleaning tool containing a composition for wiping, the composition containing at least one solvent selected from the group consisting of water and polar solvents, and a silane coupling agent, to obtain a cleaned plastic having a surface C that has been wiped with the cleaning tool; and a step 3 of applying at least one selected from the group consisting of adhesives and primers on the surface C to obtain a laminated body.

13 Claims, No Drawings

METHOD FOR PRODUCING LAMINATE

TECHNICAL FIELD

The present invention relates to a method for producing a laminate.

BACKGROUND ART

In the related art, to enhance adhesion properties between a plastic and an adhesive, hydrophilization of a surface of the plastic by surface-treating the plastic by a dry treatment, such as plasma treatment, has been known (e.g. Non-Patent Document 1).

Furthermore, for the plastic after the dry treatment, to prevent reduction in adhesion properties, typically, the surface after the dry treatment is not washed or the surface is not touched.

CITATION LIST

Patent Literature

Non-Patent Document 1: "Technology of adhesion", vol. 36, No. 3 (2016), the 124th volume, [24] to [28], published on the last day of December, 2016, published by The Adhesion Society of Japan

SUMMARY OF INVENTION

Technical Problem

In such circumstances, the present inventors evaluated a plasma-treated laminate of a polyolefin and an adhesive with reference to Non-Patent Document 1, and found that such a laminate may have low adhesion properties.

Thus, an object of the present invention is to provide a method for producing a laminate having excellent adhesion properties.

Solution to Problem

As a result of diligent research to solve the problems described above, the present inventors found that desired effects can be achieved by wiping a surface of a dry-treated plastic with a cleaning tool containing a composition for wiping, the composition containing at least one solvent selected from the group consisting of water and polar solvents, and a silane coupling agent, and thus completed the present invention.

The present invention is based on the findings described above and, specifically, solves the problem described above by the following features.

1. A method for producing a laminate, the method including:
   a step 1 of dry-treating a surface A of a plastic to obtain a dry-treated plastic having a surface B that has been dry-treated;
   a step 2 of wiping the surface B with a cleaning tool containing a composition for wiping, the composition containing at least one solvent selected from the group consisting of water and polar solvents, and a silane coupling agent, to obtain a cleaned plastic having a surface C that has been wiped with the cleaning tool; and
   a step 3 of applying at least one selected from the group consisting of adhesives and primers on the surface C to obtain a laminate.

2. The method for producing a laminate according to 1 above, where the plastic is at least one selected from the group consisting of polyolefins, polyethylene terephthalates, polymethyl methacrylate resins, polycarbonate resins, polystyrene resins, acrylonitrile styrene copolymer resins, polyvinyl chloride resins, acetate resins, acrylonitrile butadiene styrene resins, polyester resins, and polyamide resins.

3. The method for producing a laminate according to 1 or 2 above, where the dry treatment is at least one selected from the group consisting of plasma treatment, corona treatment, flame treatment, ITRO treatment, ultraviolet treatment, and excimer treatment.

4. The method for producing a laminate according to any one of 1 to 3 above, where, in the step 2, the surface B is wiped with the cleaning tool by applying a force from 25 to 0.25 kPa to the surface B.

5. The method for producing a laminate according to any one of 1 to 4 above, where the composition for wiping contains water as the solvent.

6. The method for producing a laminate according to any one of 1 to 5 above, where the silane coupling agent is an amine-based silane coupling agent.

7. The method for producing a laminate according to any one of 1 to 6 above, where
   the silane coupling agent is at least one selected from the group consisting of
   a silane compound having a hydrolyzable silyl group and an aliphatic hydrocarbon group having at least one selected from the group consisting of an amino group and an imino group,
   a hydrolyzed condensate of the silane compound, and
   an organic polymer-type silane coupling agent having a hydrolyzable silyl group and at least one selected from the group consisting of an amino group and an imino group and having an organic polymer as a main chain.

8. The method for producing a laminate according to any one of 1 to 7 above, where the silane coupling agent is water soluble.

9. The method for producing a laminate according to any one of 1 to 8 above, where a content of the silane coupling agent is from 0.01 to 30 mass % relative to a total amount of the composition for wiping.

10. The method for producing a laminate according to any one of 1 to 9 above, where a wetting tension of the surface B is 39 mN/m or greater.

11. The method for producing a laminate according to any one of 1 to 10 above, where a wetting tension of the surface C is 34 mN/m or greater.

12. The method for producing a laminate according to any one of 1 to 11 above, where the wetting tension of the surface B is greater than 65 mN/m.

13. The method for producing a laminate according to 12 above, where the wetting tension of the surface C is greater than 45 mN/m.

Advantageous Effects of Invention

According to the method for producing a laminate of an embodiment of the present invention, a laminate having excellent adhesion properties can be produced.

DESCRIPTION OF EMBODIMENTS

Embodiments of the present invention will be described in detail below.

Note that in the present specification, numerical ranges indicated using "(from) . . . to . . . " include the former number as the lower limit value and the latter number as the upper limit value.

In the present specification, a single corresponding substance may be used for each component that is used, or a combination of two or more types of corresponding substances may be used for each component that is used. When a component contains two or more types of substances, the content of the component means the total content of the two or more types of substances.

Furthermore, in the present specification, the production method of each component that is used is not particularly limited. Examples thereof include known methods.

Method for Producing Laminate

The method for producing a laminate of an embodiment of the present invention (production method according to an embodiment of the present invention) is a method for producing a laminate, the method including:

a step 1 of dry-treating a surface A of a plastic to obtain a dry-treated plastic having a surface B that has been dry-treated;

a step 2 of wiping the surface B with a cleaning tool containing a composition for wiping, the composition containing at least one solvent selected from the group consisting of water and polar solvents, and a silane coupling agent, to obtain a cleaned plastic having a surface C that has been wiped with the cleaning tool; and a step 3 of applying at least one selected from the group consisting of adhesives and primers on the surface C to obtain a laminate.

Note that, in the present specification, "at least one solvent selected from the group consisting of water and polar solvents" described above may be simply referred to as "solvent".

The composition according to an embodiment of the present invention is thought to achieve desired effects as a result of having such a configuration. Although the reason is not clear, it is assumed to be as follows.

In general, when a plastic is subjected to dry treatment, such as plasma treatment, a hydrophilic group having, for example, an oxygen atom is generated on the surface of the plastic. Furthermore, at the same time as the generation of the hydrophilic group, a chain of a polymer constituting the plastic may be cut.

When the dry treatment is excessively performed on the plastic to generate a great degree of hydrophilic groups, more cutting of the polymer on the surface of the plastic occurs. As a result, the polymer on the outermost surface of the plastic is cut short, and polymers having short molecular chains (short polymers) are generated. It is conceived that, when a large amount of the short polymers are generated, a layer of the short polymers (short polymer layer) covers at least a part of the plastic. The short polymer layer is conceived to be an extremely thin layer.

It is conceived that when the dry treatment is (excessively) performed on a plastic as described above, the plastic has the short polymer layer of the outermost surface, and a layer of polymers having undergone hydrophilization and having molecular chains that remain long (appropriately treated part) below the short polymer layer.

It is conceived that, the short polymers have hydrophilic groups by the dry treatment (the short polymers may have a relatively large amount of the hydrophilic groups), and therefore, when an adhesive or the like is applied to the dry-treated plastic, the plastic and the adhesive or the like tend to bond.

However, it was found that the adhesion properties between the dry-treated plastic and the adhesive or the like may be low (see, Comparative Examples 1-1 and 2-1 of the present specification).

It is conceived that this is because, when a laminate is formed by applying the adhesive or the like on the plastic having the short polymers on its surface, although the adhesive or the like can react with the short polymers on the laminate, the adhesive or the like is less likely to react with the layer of the polymers having undergone hydrophilization and having molecular chains that remain long (layer that can essentially be a base material) below the short polymer layer.

As described above, the adhesive or the like is less likely to react with the layer of the polymers having undergone hydrophilization and having molecular chains that remain long, and the short polymers are less likely to tangle compared to the case of the polymers before being cut. Therefore, the present inventors presume that the adhesive or the like described above may be easily released from the boundary between the short polymer layer and the layer of the polymers having undergone hydrophilization and having molecular chains that remain long.

In contrast, it is conceived that in the production method according to an embodiment of the present invention, the short polymers can be removed from the surface B by wiping the surface B of the dry-treated plastic with the cleaning tool containing the composition for wiping containing the solvent and the silane coupling agent described above in the step 2.

It is conceived that this is because the short polymers are wiped from the surface B because the composition for wiping can dissolve the short polymers and/or a physical force is applied to the surface B by wiping the surface B with the cleaning tool.

It is conceived that, the polymers having undergone hydrophilization and having molecular chains that remain long and the silane coupling agent attached to the polymers are present on the surface C of the cleaned plastic after the wiping with the cleaning tool described above.

It is conceived that because the polymers having undergone hydrophilization and having molecular chains that remain long and the silane coupling agent attached to the polymers are present on the surface C as described above, and because the adhesive or the like can react with the surface C directly or through the silane coupling agent, excellent adhesion properties of the laminate produced by the production method according to an embodiment of the present invention can be achieved.

The production method according to an embodiment of the present invention is described in detail below.

Step 1

The step 1 is a step of dry-treating a surface A of a plastic to obtain a dry-treated plastic having a dry-treated surface B.

Plastic

The plastic used in the step 1 is not particularly limited.

Examples of the plastic include polyolefins, polyethylene terephthalates, polymethyl methacrylate resins, polycarbonate resins, polystyrene resins, acrylonitrile styrene copolymer resins, polyvinyl chloride resins, acetate resins, acrylonitrile butadiene styrene resins, polyester resins, and polyamide resins.

Among these, a polyolefin is preferred. The polyolefin is not particularly limited. Examples of the polyolefin include polyethylenes; polypropylenes; ethylene propylene copolymers; cycloolefin polymers (COPs) such as polymers obtained by subjecting norbornenes to ring-opening polymerization and hydrogenation; and cycloolefin copolymers (COCs) such as copolymers of tetracyclododecene and olefins, such as ethylene.

The plastic may be, for example, a hardly adhesive resin.

The plastic may further contain an additive. The additive is not particularly limited as long as the additive can be blended to the resin. Examples of the additive include fillers such as glass fibers, carbon fibers, and white fillers (e.g., talc).

Dry Treatment

In the step 1, the dry treatment to be performed on the surface A of the plastic is not particularly limited. Examples of the dry treatment include plasma treatment, corona treatment, flame treatment, ITRO treatment, ultraviolet (UV) treatment, and excimer treatment.

Among these, an example of a preferable aspect is plasma treatment. The plasma treatment is not particularly limited.

Examples of the raw material gas used in the dry treatment include oxygen, nitrogen, and air. The raw material gas may be dried.

A hydrophilic group can be provided to the plastic by the dry treatment. Examples of the hydrophilic group include oxygen atom-containing groups, such as a hydroxy group, an aldehyde group, a carboxy group, a carbonyl group, and ether bonds; and nitrogen atom-containing groups, such as an amino group and an imino group.

One or both faces of the plastic may be dry-treated.

Dry-Treated Plastic

In the step 1, after the dry treatment, a dry-treated plastic is obtained. The dry-treated plastic has a dry-treated surface B.

Wetting Tension of Surface B

The wetting tension of the surface B typically has only to be 34 mN/m or greater, and can be 39 mN/m or greater. The upper limit of the wetting tension of the surface B is not particularly limited, but may be 73 mN/m or less.

However, for example, depending on the degree of dry treatment, the surface B may be an excessively treated region, where the degree of treatment is greater than the degree of appropriate treatment. It is conceived that a greater wetting tension of the surface B results in a greater damage (e.g., generation of the short polymer described above) of the plastic surface by the dry treatment.

In an embodiment of the present invention, in the case where the wetting tension of the surface B is greater than 65 mN/m, the surface B is considered to be in the excessively treated conditions (corresponding to the excessively treated region).

In an embodiment of the present invention, the wetting tension of (the surface A, B, or C of) the base material was measured in accordance with JIS K 6768:1999 "Plastics-Film and sheeting-Determination of wetting tension" at room temperature. As the mixed liquid for testing, a Wetting Tension Test Mixture (available from Wako Pure Chemical Industries, Ltd.) was used.

Note that the upper limit of the wetting tension that can be measured by the measurement method is 73.0 mN/m.

Because of this, in an embodiment of the present invention, in the case where the measurement value of the wetting tension is 73 mN/m, this wetting tension means 73 mN/m or greater.

Step 2

The step 2 is a step of wiping the surface B with a cleaning tool containing a composition for wiping, the composition containing at least one solvent selected from the group consisting of water and polar solvents, and a silane coupling agent, to obtain a cleaned plastic having a surface C that has been wiped with the cleaning tool.

Note that, in the present invention, "cleaning tool containing the composition for wiping" may be, hereinafter, simply referred to as "cleaning tool". Furthermore, the base material used to allow the composition for wiping to be contained is referred to as "cleaning base material".

Cleaning Tool

In the step 2, to wipe the surface B of the dry-treated plastic, the cleaning tool containing the composition for wiping is used.

In the cleaning tool, the content of the composition for wiping is preferably from 10 to 95 mass %, and more preferably from 80 to 95 mass %, relative to the total amount of the cleaning tool.

Cleaning Base Material

The cleaning base material used to allow the composition for wiping to be contained is not particularly limited.

Examples of the cleaning base material include fabric, paper, and sponge.

Examples of the material of the cleaning base material include cellulose, polyamide, polyester, and melamine.

Examples of the form of the fabric include nonwoven fabric and woven fabric.

A preferred aspect is one in which the cleaning base material does not include a roller and a brush.

Composition for Wiping

The composition for wiping contains at least one solvent selected from the group consisting of water and polar solvents, and a silane coupling agent.

Solvent

The solvent contained in the composition for wiping is at least one selected from the group consisting of water and polar solvents.

Water

Water is not particularly limited. Examples of the water include distilled water.

Polar Solvent

The polar solvent is not particularly limited. Examples of the polar solvent include alcohols, such as methanol, ethanol, propanol, and isopropanol; ketones, such as acetone and methyl ethyl ketone; esters, such as ethyl acetate and butyl acetate; ether compounds, such as tetrahydrofuran and diethyl ether; dimethylsulfoxide; and dimethylformamide.

From the perspective of achieving superior adhesion properties, the solvent preferably contains at least water, and more preferably contains only water.

In the case where water and a polar solvent are used in combination, the mass ratio of the polar solvent to the water (polar solvent/water) is preferably from 0.1 to 99 mass %, and more preferably from 0.1 to 50 mass %, from the perspective of superior adhesion properties.

Silane Coupling Agent

The silane coupling agent contained in the composition for wiping is not particularly limited as long as the silane coupling agent is a compound having a hydrolyzable silyl group or silanol group, and a functional group.

Hydrolyzable Silyl Group

Examples of the hydrolyzable silyl group contained in the silane coupling agent include alkoxysilyl groups. The number of alkoxy groups bonded to one silicon atom is preferably 2 or 3. Examples of the alkoxy group include a methoxy group and an ethoxy group.

In the case where the number of alkoxy groups bonded to one silicon atom is 2 or less, the hydrocarbon group that can bond to the silicon atom is not particularly limited. Examples thereof include alkyl groups and a phenyl group.

Silanol Group

The silanol group has only to be a group in which an OH group is bonded to a silicon atom. The silanol group may be a silanol group obtained by subjecting a hydrolyzable silyl group to hydrolysis.

The silane coupling agent can have one or a plurality of hydrolytic silyl groups or silanol groups in one molecule.

Functional Group

Examples of the functional group contained in the silane coupling agent include an amino group, an imino group (—NH—), an epoxy group, and a hydroxy group. Among these, an amino group or an imino group is preferred.

Note that, in the case where the hydrolyzed condensate has an epoxy group, at least some or all of the epoxy groups may be hydrolyzed. The hydrolyzed epoxy group can form a hydroxy group.

The silane coupling agent can have one or a plurality of the functional groups in one molecule.

The silane coupling agent is preferably an amine-based silane coupling agent having an amino group and/or an imino group as functional group(s).

In the silane coupling agent, the hydrolyzable silyl group or the silanol group can bond to an organic group or a polysiloxane. The same applies to the functional group.

The hydrolyzable silyl group or the silanol group can bond to the functional group through an organic group or a polysiloxane as a linking group.

Organic Group

The organic group is not particularly limited. Examples thereof include hydrocarbon groups. Specific examples thereof include aliphatic hydrocarbon groups (including straight-chain, branched, cyclic, or combinations thereof).

The organic group can form, for example, a backbone of a silane compound; a linking group for a main chain (polysiloxane backbone) in a hydrolyzed condensate of a silane compound and a functional group; or a main chain or a side chain of an organic polymer-type silane coupling agent, described below.

Note that, in the present specification, "an imino group as a functional group bonds to a hydrocarbon group as an organic group" means that any carbon atom of the hydrocarbon group is replaced by a nitrogen atom constituting the imino group.

Furthermore, in the present specification, a diaminoalkyl group means a group in which any two selected from the group consisting of carbon atoms and hydrogen atoms constituting one alkyl group (aliphatic hydrocarbon group) are replaced by nitrogen atoms, or means having two groups in which any one selected from the group consisting of hydrogen atoms and carbon atoms constituting an alkyl group (aliphatic hydrocarbon group) is replaced by a nitrogen atom.

Examples of the silane coupling agent include a low molecular weight compound (silane compound), a hydrolyzed condensate of a low molecular weight compound, and a compound having an organic polymer as a main chain (organic polymer-type silane coupling agent).

Silane Compound

In the case where the silane coupling agent is a low molecular weight compound (e.g., a silicon atom and an organic group are a monomer unit), this may be referred to as "silane compound".

The silane compound can have one or a plurality of silicon atoms in one molecule. Note that, in the case where the silane compound has a plurality of silicon atoms, the plurality of the silicon atoms do not form a polysiloxane backbone (polymer having a plurality of repeating units represented by (—Si—O—)).

In the silane compound, a functional group (e.g., at least one selected from the group consisting of an amino group, an imino group, and an epoxy group) preferably bonds to an aliphatic hydrocarbon group as the organic group.

Examples of the silane compound include aminosilane compounds (silane compound having an amino group and/or an imino group as functional group(s)), and epoxysilane compounds (silane compound having an epoxy group as a functional group).

Hydrolyzed Condensate (Polysiloxane-Type Silane Coupling Agent)

In an embodiment of the present invention, the hydrolyzed condensate of the silane compound (polysiloxane-type silane coupling agent having a hydrolyzable silyl group or silanol group and a functional group) may be simply referred to as "hydrolyzed condensate".

By subjecting the silane compound to hydrolysis-condensation, a polysiloxane backbone is formed (polymer having a plurality of repeating units represented by (—Si—O—)).

The hydrolyzed condensate may be an oligomer.

In the hydrolyzed condensate, the hydrolyzable silyl group or the silanol group can bond to the polysiloxane backbone.

In the hydrolyzed condensate, the functional group can bond to the polysiloxane backbone directly or through an organic group. The functional group (e.g., at least one selected from the group consisting of an amino group, an imino group, and an epoxy group) preferably bonds to the polysiloxane backbone through an aliphatic hydrocarbon group as the organic group.

For example, an alkyl group or a phenyl group may be further bonded to the silicon atom constituting the polysiloxane backbone.

Examples of the hydrolyzed condensate include hydrolyzed condensates of aminosilane compounds and/or epoxysilane compounds. Specific examples thereof include aminosilane oligomers and epoxysilane oligomers.

In the present specification, the aminosilane oligomer means an oligomer (hydrolyzed condensate) of an aminosilane compound. The epoxysilane oligomer means an oligomer (hydrolyzed condensate) of an epoxysilane compound.

Organic Polymer-Type Silane Coupling Agent

In an embodiment of the present invention, the silane coupling agent having a hydrolyzable silyl group or silanol group and a functional group and having an organic polymer as a main chain also may be referred to as "organic polymer-type silane coupling agent".

In the organic polymer-type silane coupling agent, the hydrolyzable silyl group or silanol group and the functional group can bond to the organic polymer, which is the main chain. The organic polymer (main chain) has only to be a polymer formed from an organic material having carbon.

In the case where the silane coupling agent is the organic polymer-type silane coupling agent, the functional group can bond to the main chain directly or through an organic group. The same applies to the hydrolyzable silyl group or silanol group.

As the silane coupling agent, aminosilane compounds, epoxysilane compounds, hydrolyzed condensates thereof (polysiloxane-type silane coupling agents), and organic polymer-type silane coupling agents having an amino group and/or an imino group as functional group(s) are preferred, and aminosilane compounds, hydrolyzed condensates thereof, and organic polymer-type silane coupling agents having an amino group and/or an imino group as functional group(s) are more preferred.

Aminosilane Compound

Examples of the aminosilane compound include aminosilane compounds having an aliphatic hydrocarbon group having one amino group, such as 3-aminopropyltrimethoxysilane and 3-aminopropylmethyldimethoxysilane;

di(aminoalkyl)alkoxysilane;

di(amino)alkylalkoxysilane;

(amino-imino)alkylsilane compounds having an aliphatic hydrocarbon group having one amino group and one imino group, such as 2-aminoethyl-3-aminopropyltrimethoxysilane; and aminosilane compounds having an aliphatic hydrocarbon group having one imino group, such as N-phenyl-3-aminopropyltrimethoxysilane.

Hydrolyzed Condensate of Aminosilane Compound

Examples of the hydrolyzed condensate of an aminosilane compound include polysiloxanes having an aliphatic hydrocarbon group having an amino group and/or an imino group. The aliphatic hydrocarbon group can bond to a silicon atom.

The hydrolyzed condensate may further contain an alkyl group. The alkyl group can bond to a silicon atom.

The amino group or the imino group contained in the hydrolyzed condensate of the aminosilane compound may form a salt with carboxylic acid, such as formic acid.

Epoxysilane Compound

Examples of the epoxysilane compound include 3-glycidyloxypropyltrimethoxysilane and 2-(3,4-epoxycyclohexyl)ethyltrimethoxysilane.

Hydrolyzed Condensate of Epoxysilane Compound

Examples of the hydrolyzed condensate of the epoxysilane compound include polysiloxanes having an epoxy group. The epoxy group can bond to a silicon atom through the main chain (polysiloxane) and an organic group (e.g. aliphatic hydrocarbon group).

The hydrolyzed condensate may further contain an alkyl group. The alkyl group can bond to a silicon atom.

In the hydrolyzed condensate of the epoxysilane compound, some or all of epoxy groups may be hydrolyzed.

From the perspective of achieving superior adhesion properties, the silane coupling agent is preferably water soluble (aqueous).

Content of Silane Coupling Agent

The content of the silane coupling agent is preferably from 0.01 to 30 mass %, more preferably from 0.1 to 10 mass %, and even more preferably from 0.5 to 3 mass %, relative to the total amount of the composition for wiping from the perspective of achieving superior adhesion properties.

Note that, in the case where the silane coupling agent is a dispersion containing a dispersion medium, the content of the silane coupling agent means the amount of the solid contents of the silane coupling agent in the dispersion (net amount of the silane coupling agent). The dispersion medium may be same as the solvent described above.

Method for Preparing Composition for Wiping

As the method for preparing a composition for wiping, for example, the composition for wiping can be prepared by mixing a solvent and a silane coupling agent.

In the case where the silane coupling agent is a dispersion, the composition for wiping can be prepared by adding the solvent to the silane coupling agent. The solvent is preferably of the same type as the dispersion medium.

The composition for wiping preferably contains only the solvent and the silane coupling agent, and more preferably contains only water and the silane coupling agent.

Method for Preparing Cleaning Tool

As the method for preparing the cleaning tool, for example, the cleaning tool can be prepared by immersing the cleaning base material in the composition for wiping, pulling up the cleaning tool containing the composition for wiping from the composition for wiping, and squeezing the cleaning tool that was pulled up.

The cleaning tool has only to be in a condition in which the cleaning base material is soaked with the composition for wiping.

Wiping

When the surface B is wiped with the cleaning tool, the cleaning tool can be used, for example, in a condition in which the cleaning tool is spread or folded or in a condition in which one or a plurality of cleaning tools are overlapped.

Furthermore, the cleaning tool may be, for example, moved back and forth on the surface B; however, one wiping is preferred.

In the step 2, it is preferable to wipe the surface B with the cleaning tool by applying a force (pressure) of 25 to 0.25 kPa to the surface B (e.g. in a vertical direction). The force is more preferably from 13.5 to 1.0 kPa.

The force is determined by placing a dry-treated plastic on an electric balance (trade name: BX 4200H, available from Shimadzu Corporation), performing zero point adjustment, wiping the surface of the dry-treated plastic with the cleaning tool and, at this time, measuring the load applied to the dry-treated plastic. Note that 1 kgf is equated to 9.8 N.

The load applied during one wiping or the average value of the measurements in the case where wiping was performed for a plurality of times or back and forth was divided by the area of the cleaning tool, which is in contact with the dry-treated plastic to calculate the force.

Cleaned Plastic

In the step 2, a cleaned plastic having the surface C wiped with the cleaning tool can be obtained.

After the wiping with the cleaning tool, the composition for wiping remained on the surface C may be dried. The method of drying is not particularly limited. Examples thereof include natural drying.

Wetting Tension of Surface C

The wetting tension of the surface C is preferably 34 mN/m or greater.

The wetting tension of the surface C is preferably smaller than the wetting tension of the surface B.

Wetting Tension of Surface C in the Case where Wetting Tension of Surface B is Greater than 65 mN/m In the case where the wetting tension of the surface B is greater than 65 mN/m, the wetting tension of the surface C can be equal to or less than the wetting tension of the surface B. Furthermore, in this case, the wetting tension of the surface C is preferably greater than 45 mN/m.

Wetting Tension of Surface C in the Case where Wetting Tension of Surface B is 65 mN/m or Less In the case where the wetting tension of the surface B is 65 mN/m or less, the wetting tension of the surface C has only to be 34 mN/m or greater but 65 mN/m or less or less than 65 mN/m, and may be 34 mN/m or greater but 60 mN/m or less or less than 50 mN/m.

Degree of Decrease from Wetting Tension of Surface B to Wetting Tension of Surface C The degree of decrease from the wetting tension of the surface B to the wetting tension of the surface C is preferably 0 mN/m or greater (or greater than 0 mN/m) but 15 mN/m or less.

Note that the degree of decrease from the wetting tension of the surface B to the wetting tension of the surface C means the difference between the wetting tension of the surface B and the wetting tension of the surface C (wetting tension of surface B−wetting tension of surface C).

Furthermore, in an embodiment of the present invention, in the case where the measurement result of the wetting tension of the surface B is 73 mN/m, this means 73 mN/m or greater as described above. However, in the calculation of the degree of decrease, the wetting tension of the surface B described above is evenly treated as 73 mN/m. The same applies to the surface C. Therefore, in the case where the measurement results of the wetting tensions of the surfaces B and C were 73 mN/m, the degree of decrease is 0 mN/m.

Step 3

The step 3 is a step of obtaining a laminate by applying at least one selected from the group consisting of adhesives and primers to a surface C of the cleaned plastic.

An example of a preferable aspect is one in which an adhesive is applied to the surface C.

An example of a preferable aspect is one in which the composition for wiping used in the step 2 contains no adhesive. The same applies to the primer described above.

Adhesive

The adhesive that can be used in the step 3 is not particularly limited. Examples of the adhesive include urethane-based adhesives, epoxy-based adhesives, acryl-based adhesives, and modified silicone-based adhesives.

Among these, a preferable aspect is a urethane-based adhesive.

The urethane-based adhesive is not particularly limited. Examples of the urethane-based adhesive include compositions containing a urethane prepolymer and compositions containing a urethane prepolymer and a polyol.

Urethane Prepolymer

The urethane prepolymer is a polymer having a plurality of isocyanate groups in one molecule. The urethane prepolymer preferably has an isocyanate group at a molecular terminal. As the urethane prepolymer, known urethane prepolymers can be used. For example, a reaction product, obtained by reacting a polyisocyanate compound with a compound having at least two active hydrogen-containing groups in one molecule (hereinafter, abbreviated as "active hydrogen compound") in a manner that the amount of the isocyanate group is in excess relative to the amount of the active hydrogen-containing groups, or the like can be used.

In the present invention, "active hydrogen-containing group" indicates "group containing an active hydrogen". Examples of the active hydrogen-containing group include a hydroxy group, an amino group, and an imino group.

Polyisocyanate Compound

The polyisocyanate compound used during production of the urethane prepolymer is not particularly limited as long as the polyisocyanate compound has two or more isocyanate groups in one molecule.

Examples of the polyisocyanate compound include aromatic polyisocyanate compounds, such as tolylene diisocyanate (TDI; e.g., 2,4-tolylene diisocyanate and 2,6-tolylene diisocyanate), diphenylmethane diisocyanate (MDI; e.g., 4,4'-diphenylmethane diisocyanate and 2,4'-diphenylmethane diisocyanate), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic and/or alicyclic polyisocyanates, such as hexamethylene diisocyanate (HDI), trimethylhexamethylene diisocyanate (TMHDI), lysine diisocyanate, norbornane diisocyanate (NBDI), transcyclohexane-1,4-diisocyanate, isophorone diisocyanate (IPDI), bis(isocyanate methyl)cyclohexane ($H_6$XDI), and dicyclohexylmethane diisocyanate ($H_{12}$MDI); carbodiimide-modified polyisocyanates thereof; and isocyanurate-modified polyisocyanates thereof.

Active Hydrogen Compound

The compound having two or more active hydrogen-containing groups in one molecule (active hydrogen compound) that is used during production of the urethane prepolymer is not particularly limited. Examples of the active hydrogen-containing group include a hydroxy (OH) group, an amino group, and an imino group.

Preferred examples of the active hydrogen compound include polyol compounds having two or more hydroxy (OH) groups in one molecule, and polyamine compounds having two or more amino groups and/or imino groups in one molecule. Among these, a polyol compound is preferable.

The molecular weight, backbone, and the like of the polyol compound are not particularly limited as long as the polyol compound has two or more OH groups. Specific examples thereof include polyether polyols; polyester polyols; polymer polyols having a carbon-carbon bond in the main chain backbone, such as acrylic polyols, polybutadiene diols, and hydrogenated polybutadiene polyols; low-molecular-weight polyhydric alcohols; and mixed polyols thereof. Among these, a polyether polyol is exemplified as an example of preferable aspects.

The urethane prepolymer is preferably a urethane prepolymer formed by reacting a polyether polyol and an aromatic polyisocyanate compound, from the perspective of achieving even better adhesion properties and excellent curability.

The method for producing the urethane prepolymer is not particularly limited. For example, the urethane prepolymer can be produced by using a polyisocyanate compound in a manner that from 1.5 to 2.5 mol of isocyanate group is reacted per 1 mol of the active hydrogen-containing group (e.g. hydroxy group) contained in the active hydrogen compound, and mixing these to perform a reaction.

The urethane prepolymer can be used alone or in combination of two or more kinds.

In the case where the urethane-based adhesive further contains, for example, a polyol in addition to the urethane prepolymer, examples of the polyol that can be further contained include those same as the polyol compounds that are used during production of the urethane prepolymer described above.

Primer

The presence and the type of the primer that can be used in the step 3 are not particularly limited. Examples thereof include known methods. Specific examples thereof include compositions containing a phenolic resin, an epoxy resin, a urethane resin, or an acrylic resin. The primer can be selected depending on the adhesive and/or the base material (plastic).

Laminate

In the step 3, a laminate can be obtained by applying at least one selected from the group consisting of adhesives and primers to the surface C.

The method for the application is not particularly limited. Examples thereof include known methods.

Furthermore, after the application, the adhesive can be cured or the primer can be dried at room temperature or under heating conditions. The temperature conditions can be appropriately determined depending on the adhesive or primer used.

The laminate has the cleaned plastic and a layer formed from at least one selected from the group consisting of adhesives and primers.

Furthermore, the laminate can further contain another base material on the layer containing at least the adhesive.

Examples of such another base material include glass, rubbers, plastics, and metals.

In the case where such another base material is a plastic in which dry treatment has been performed, the treatment of the step 2 is preferably performed on the plastic in which dry treatment has been performed, as such another base material, from the perspective of achieving superior adhesion properties.

Examples of the layer containing at least the adhesive include one layer containing only the adhesive; a layer having two layers, which are a layer of adhesive and a layer of primer; and a layer having three layers, which are a layer of primer, a layer of adhesive, and a layer of primer.

Examples of the laminate further having another base material include a laminate having the layer containing at least the adhesive, in between two pieces of the cleaned plastics described above (hereinafter, these may be referred to as "two plastics").

As the method for producing the laminate having the layer containing at least the adhesive in between the two plastics, for example, in accordance with the steps 1 and 2 described above, each of the two plastic is produced (the two plastics may be the same or different); and in accordance with the step 3, at least the adhesive is applied to at least one of the two plastics described above; then, after the step 3, in the step 4, the cleaned plastic to which the adhesive was applied and the other cleaned plastic are bonded to each other; and thus a laminate having the layer containing at least the adhesive in between the two plastics described above can be produced.

After the adhesion, the adhesive can be cured at room temperature or under heating conditions.

The production method according to an embodiment of the present invention can be, for example, applied to assembly of automobile components.

EXAMPLE

The present invention is described below in detail using examples but the present invention is not limited to such examples.

Preparation of Composition for Wiping

The solvent and the silane coupling agent shown in the section of each of Examples and Comparative Examples of Tables 1 below were mixed in a manner that the net content of the silane coupling agent was the "content of the silane coupling agent" shown in the same tables relative to the total amount of the composition for wiping, to prepare a composition for wiping.

Note that organic solvents, other than the distilled water, shown in the "solvent" columns of Tables 1 were commercially available products.

Examples 1-1 to 14, Comparative Examples 1-1 to 8, Examples 2-1 to 15, and Comparative Examples 2-1 to 7

Step 1

For each Example, as base materials (plastics), 6 sheets of talc-containing composite polypropylene (trade name: Daicel PP PP composite resin PT4N1, available from Daicel Polymer Ltd.; length: 12 cm; width: 2.5 cm; thickness: 3 mm) were prepared.

Each of the base materials described above was subjected to plasma treatment by using trade name: FG3001 (Jet Nozzle RD1004), available from Plasmatreat GmbH, as a plasma treatment instrument under the following plasma treatment conditions to obtain a plasma-treated plastic.

Plasma Treatment Conditions

The plasma treatment conditions were as follows.

Distance between the base material and the jet nozzle: 5 mm

Treatment speed: 80 mm/sec

Number of passes: 1 pass

Output of instrument: 210000 kHz

Raw material gas: Dry air

Wetting Tension of Surface B of Plasma-Treated Plastic

The wetting tension of the surface B of each of the plasma-treated plastics was measured in accordance with JIS K 6768:1999 "Plastics-Film and sheeting-Determination of wetting tension" at room temperature. As the mixed liquid for testing, a Wetting Tension Test Mixture (available from Wako Pure Chemical Industries, Ltd.) was used.

It was confirmed that the wetting tension of each of the plasma-treated plastics was greater than 65 mN/m.

Note that, in Tables 1, the wetting tension of the surface B of "73 mN/m" means the wetting tension of the surface B being 73 mN/m or greater.

Step 2

Preparation of Cleaning Tool

As the cleaning base material, trade name: Bemcot (available from Asahi Kasei Corporation; continuous long cupra non-woven fabric: weight per one sheet: 0.6 g) was used.

The cleaning base material was immersed in each of the compositions for wiping prepared as described above, the cleaning tool containing the composition for wiping was pulled up from the composition, and the pulled-up cleaning tool was squeezed.

The weight of the cleaning tool was from 4.5 to 3.0 g per one sheet.

Treatment Using Cleaning Tool

The surface B of the plasma-treated plastic was wiped in one direction once with one sheet of the cleaning tool prepared as described above while a force of 7.5 kPa was applied to the surface, to obtain a cleaned plastic.

The plasma-treated plastics of Comparative Example 1-1 and Comparative Example 2-1 were not wiped with the cleaning tool.

In Comparative Example 1-2 and Comparative Example 2-2, the plasma-treated plastics were immersed in water, pulled up from the water after the immersion, and dried in air, instead of being wiped with the cleaning tool.

Wetting Tension of Surface C

The wetting tension of the surface C of each of the cleaned plastics obtained as described above was measured by the same method as described above. The results (the average values of the wetting tensions of the six sheets of cleaned plastics) are shown in Tables 1.

Note that, in Tables 1, the wetting tension of the surface C of "73 mN/m" means the wetting tension of the surface C being 73 mN/m or greater.

Step 3

Adhesive 1

As the adhesive 1, a two-part urethane-based adhesive (main agent containing urethane prepolymer: WS-222; polyol-based curing agent: B-1; both are available from The Yokohama Rubber Co., Ltd.) was used. The main agent and the curing agent were used in the mass ratio (main agent: curing agent) of 10:1, and mixed and used as the adhesive 1.

Adhesive 2

As the adhesive 2, a two-part urethane-based adhesive (main agent containing urethane prepolymer: WS-242; polyol-based curing agent: AN-1; both are available from The Yokohama Rubber Co., Ltd.) was used. The main agent and the curing agent were used in the mass ratio (main agent:curing agent) of 10:1, and mixed and used as the adhesive 2.

Laminate

Among the six sheets of cleaned plastics, a pair of two sheets of the cleaned plastics was used for each Example to produce three pieces of laminates.

Among the two sheets of the cleaned plastics used in each of the laminates, the adhesive described above was applied to the surface C of one sheet of the cleaned plastics.

The other one sheet of the cleaned plastics was placed on top of the cleaned plastic to which the adhesive was applied. In more detail, the two cleaned plastics were bonded to each other in a manner that the surfaces C faced each other and both of the cleaned plastics were overlapped by 1 cm in the longitudinal direction (the thickness of the adhesive after the adhesion was 3 mm). After the cleaned plastics were overlapped as described above, the cleaned plastics were cured for 3 days at room temperature to obtain a laminate.

Example 1-15

A laminate was produced in the same manner as in Example 1-3 except for changing the plasma treatment conditions of the step 1 to the following conditions. The wetting tension (average value) of the plasma-treated base material was 58 mN/m.

Distance between the base material and the jet nozzle: 15 mm
Treatment speed: 175 mm/sec
Number of passes: 1 pass
Output of instrument: 210000 kHz
Raw material gas: Dry air Example 2-16

A laminate was produced in the same manner as in Example 2-3 except for changing the plasma treatment conditions of the step 1 to the following conditions. The wetting tension (average value) of the plasma-treated base material was 58 mN/m.

Distance between the base material and the jet nozzle: 15 mm
Treatment speed: 175 mm/sec
Number of passes: 1 pass
Output of instrument: 210000 kHz
Raw material gas: Dry air Evaluation A shear test was performed by using the laminate produced as described above, and the adhesive strength and the fracture mode were evaluated. The results are shown in Tables 1.

The shear test was performed in accordance with JIS K 6850:1999 at the pulling speed of 50 mm/min at 20° C.

Three pieces of the laminates were produced for each of the Examples and Comparative Examples as described above, and each of the laminates was evaluated.

In each of the Examples and Comparative Examples of Tables 1, for each evaluation item, the average value of evaluation results of the three pieces of the laminates was shown.

Note that, in the evaluation of the fracture mode, CF means the cohesive failure of the adhesive, MF means the failure in the base material, and AF means the interfacial failure between the adhesive and the base material surface. The value of the "CF" columns is a proportion (%) of the area of CF relative to the total adhesion area. The value of the "MF" columns is a proportion (%) of the area of MF relative to the total adhesion area. The value of the "AF" columns is a proportion (%) of the area of AF relative to the total adhesion area.

TABLE 1

| Table 1 (No. 1) | (Step 2) Composition for wiping | | | | | Laminate | | | | Wetting tension of surface B (mN/m) | Wetting tension of surface C (mN/m) |
|---|---|---|---|---|---|---|---|---|---|---|---|
| | Solvent | Silane coupling agent | Content of silane coupling agent (Mass %) | (Step 2) Wiping with cleaning tool | Adhesive | CF (%) | MF (%) | AF (%) | Adhesive strength (Mpa) | | |
| Comparative Example 1-1 | None | None | — | No | Adhesive | | | 100 | 0.41 | 73 | 73 |
| Comparative Example 1-2 | None | None | — | No * | 1 | 10 | | 90 | 0.85 | 73 | 54 |
| Comparative Example 1-3 | n-Hexane | None | — | Yes | | 10 | | 90 | 0.92 | 73 | 73 |
| Comparative Example 1-4 | n-Hexane | Compound 4 | 1 | Yes | | | | 100 | 0.37 | 73 | 54 |
| Comparative Example 1-5 | n-Hexane | Compound 5 | 1 | Yes | | | | 100 | 0.28 | 73 | 54 |

TABLE 1-continued

| Table 1 (No. 1) | Solvent | Silane coupling agent | Content of silane coupling agent (Mass %) | (Step 2) Wiping with cleaning tool | Adhesive | Laminate CF (%) | MF (%) | AF (%) | Adhesive strength (Mpa) | Wetting tension of surface B (mN/m) | Wetting tension of surface C (mN/m) |
|---|---|---|---|---|---|---|---|---|---|---|---|
| Comparative Example 1-6 | n-Hexane | Compound 6 | 1 | Yes | | | | 100 | 0.33 | 73 | 38 |
| Comparative Example 1-7 | n-Hexane | Compound 8 | 1 | Yes | | | | 100 | 0.32 | 73 | 54 |
| Comparative Example 1-8 | n-Hexane | Compound 9 | 1 | Yes | | | | 100 | 0.25 | 73 | 56 |
| Example 1-1 | Water | Compound 1 | 1 | Yes | | 90 | 10 | | 3.86 | 73 | 73 |
| Example 1-2 | Water | Compound 2 | 1 | Yes | | 100 | | | 3.58 | 73 | 73 |
| Example 1-3 | Water | Compound 3 | 1 | Yes | | 100 | | | 4.03 | 73 | 73 |
| Example 1-4 | Water | Compound 4 | 1 | Yes | | 100 | | | 3.84 | 73 | 65 |
| Example 1-5 | Water | Compound 5 | 1 | Yes | | 100 | | | 3.66 | 73 | 65 |
| Example 1-6 | Water | Compound 6 | 1 | Yes | | 90 | 10 | | 3.90 | 73 | 73 |
| Example 1-7 | Water | Compound 7 | 1 | Yes | | 95 | 5 | | 3.67 | 73 | 73 |
| Example 1-8 | Water | Compound 9 | 1 | Yes | | 40 | | 60 | 2.53 | 73 | 65 |
| Example 1-9 | IPA | Compound 3 | 1 | Yes | | 100 | | | 3.73 | 73 | 73 |
| Example 1-10 | IPA | Compound 5 | 1 | Yes | | 95 | | 5 | 3.46 | 73 | 73 |
| Example 1-11 | Water | Compound 3 | 0.1 | Yes | | 100 | | | 3.91 | 73 | 65 |
| Example 1-3 | Water | Compound 3 | 1 | Yes | | 100 | | | 4.03 | 73 | 73 |
| Example 1-12 | Water | Compound 3 | 10 | Yes | | 100 | | | 3.86 | 73 | 73 |
| Example 1-13 | Water | Compound 5 | 0.1 | Yes | | 100 | | | 3.75 | 73 | 65 |
| Example 1-5 | Water | Compound 5 | 1 | Yes | | 100 | | | 3.66 | 73 | 65 |
| Example 1-14 | Water | Compound 5 | 10 | Yes | | 100 | | | 3.79 | 73 | 65 |
| Example 1-15 | Water | Compound 3 | 1 | Yes | | 100 | | | 3.95 | 58 | 46 |

* Instead of the step 2, the plasma-treated base material was immersed in water, pulled-up from the water, and then naturally dried in air.

TABLE 2

| Table 1 (No. 2) | Solvent | Silane coupling agent | Content of silane coupling agent (Mass %) | (Step 2) Wiping with cleaning tool | Adhesive | Laminate CF (%) | MF (%) | AF (%) | Adhesive strength (Mpa) | Wetting tension of surface B (mN/m) | Wetting tension of surface C (mN/m) |
|---|---|---|---|---|---|---|---|---|---|---|---|
| Comparative Example 2-1 | None | None | — | No | Adhesive | 5 | | 95 | 0.66 | 73 | 73 |
| Comparative Example 2-2 | None | None | — | No * | 2 | 50 | | 50 | 1.20 | 73 | 54 |
| Comparative Example 2-3 | n-Hexane | Compound 4 | 1 | Yes | | | | 100 | 0.37 | 73 | 73 |

TABLE 2-continued

| Table 1 (No. 2) | Solvent | Silane coupling agent | Content of silane coupling agent (Mass %) | (Step 2) Wiping with cleaning tool | Ad-hesive | CF (%) | MF (%) | AF (%) | Adhesive strength (Mpa) | Wetting tension of surface B (mN/m) | Wetting tension of surface C (mN/m) |
|---|---|---|---|---|---|---|---|---|---|---|---|
| Comparative Example 2-4 | n-Hexane | Compound 5 | 1 | Yes | | | | 100 | 0.41 | 73 | 54 |
| Comparative Example 2-5 | n-Hexane | Compound 6 | 1 | Yes | | | | 100 | 0.29 | 73 | 54 |
| Comparative Example 2-6 | n-Hexane | Compound 8 | 1 | Yes | | | | 100 | 0.24 | 73 | 38 |
| Comparative Example 2-7 | n-Hexane | Compound 9 | 1 | Yes | | | | 100 | 0.39 | 73 | 54 |
| Example 2-1 | Water | Compound 1 | 1 | Yes | | 95 | 5 | | 3.92 | 73 | 60 |
| Example 2-2 | Water | Compound 2 | 1 | Yes | | 98 | 2 | | 3.79 | 73 | 73 |
| Example 2-3 | Water | Compound 3 | 1 | Yes | | 100 | | | 4.11 | 73 | 73 |
| Example 2-4 | Water | Compound 4 | 1 | Yes | | 98 | 2 | | 3.72 | 73 | 73 |
| Example 2-5 | Water | Compound 5 | 1 | Yes | | 95 | 5 | | 3.62 | 73 | 65 |
| Example 2-6 | Water | Compound 6 | 1 | Yes | | 98 | 2 | | 3.64 | 73 | 65 |
| Example 2-7 | Water | Compound 7 | 1 | Yes | | 100 | | | 3.88 | 73 | 73 |
| Example 2-8 | Water | Compound 8 | 1 | Yes | | 98 | 2 | | 3.54 | 73 | 73 |
| Example 2-9 | Water | Compound 9 | 1 | Yes | | 100 | | | 3.49 | 73 | 65 |
| Example 2-10 | IPA | Compound 3 | 1 | Yes | | 100 | | | 3.93 | 73 | 73 |
| Example 2-11 | IPA | Compound 5 | 1 | Yes | | 100 | | | 3.70 | 73 | 73 |
| Example 2-12 | Water | Compound 3 | 0.1 | Yes | | 100 | | | 4.07 | 73 | 65 |
| Example 2-3 | Water | Compound 3 | 1 | Yes | | 100 | | | 4.11 | 73 | 73 |
| Example 2-13 | Water | Compound 3 | 10 | Yes | | 100 | | | 3.93 | 73 | 73 |
| Example 2-14 | Water | Compound 5 | 0.1 | Yes | | 100 | | | 3.81 | 73 | 65 |
| Example 2-5 | Water | Compound 5 | 1 | Yes | | 95 | 5 | | 3.62 | 73 | 65 |
| Example 2-15 | Water | Compound 5 | 10 | Yes | | 100 | | | 3.77 | 73 | 65 |
| Example 2-16 | Water | Compound 3 | 1 | Yes | | 100 | | | 4.03 | 58 | 46 |

* Instead of the step 2, the plasma-treated base material was immersed in water, pulled-up from the water, and then naturally dried in air.

Details of the silane coupling agents described in Tables 1 are as follows.

Compound 1: Water-soluble amine-based silane coupling agent. Aminosilane oligomer. Trade name: Dynasylan SIVO 140, available from Evonik Industries AG., Solid content: 25 mass %. A colloidal silica aqueous solution obtained by an aminosilane oligomer having an aliphatic hydrocarbon group having an amino group and/or an imino group and having a polysiloxane backbone as a main chain (hydrolyzed condensate). pH=4-5.

Compound 2: Water-soluble amine-based silane coupling agent. Amino-modified polysiloxane-formic acid salt. Trade name: Dynasylan SIVO 160, available from Evonik Industries AG., Solid content: 9 mass %. A polysiloxane backbone is contained as a main chain. An aliphatic hydrocarbon group having an amino group and/or an imino group is contained. pH=4 to 5.

Compound 3: Water-soluble organic polymer-type polyfunctional aminosilane coupling agent. Trade name: X-12-972F, available from Shin-Etsu Chemical Co., Ltd., Solid content: 15 mass %. An organic polymer is contained as a main chain, and a plurality of amino groups and a plurality of triethoxysilyl groups are contained as side chains.

Compound 4: Water-based aminosilane oligomer having an aminoalkyl group bonded to a silicon atom (hydrolyzed condensate of aminosilane compound). A polysiloxane backbone is contained as a main chain. Trade name: Dynasylan (trade name) HYDROSIL 1151, available from Evonik Industries AG. Aqueous solution, Solid content (net amount of silane coupling agent: the aminosilane oligomer described above): approximately 40 mass %. pH=approximately 10.

Compound 5: Water-based aminosilane oligomer having an aminoalkyl group bonded to a silicon atom and having an alkyl group bonded to a silicon atom (hydrolyzed condensate of aminosilane compound). A polysiloxane backbone is contained as a main chain. Trade name: Dynasylan (trade name) HYDROSIL 2627, available from Evonik Industries AG. Aqueous solution, Solid content (net amount of silane coupling agent: the aminosilane oligomer described above): from 19 to 21 mass %. Amine content relative to the total amount of the aminosilane oligomer: from 2.0 to 2.5%. pH=approximately 10.

Compound 6: Water-based aminosilane oligomer having a diaminoalkyl group bonded to a silicon atom and having an alkyl group bonded to a silicon atom (hydrolyzed condensate of aminosilane compound). A polysiloxane backbone is contained as a main chain. Trade name: Dynasylan (trade name) HYDROSIL 2776, available from Evonik Industries AG. Aqueous solution, Solid content (net amount of silane coupling agent: the aminosilane oligomer described above): from 23 to 27 mass %. Amine content relative to the total amount of the aminosilane oligomer: from 4.2 to 4.7%. pH=approximately 10.

Compound 7: Water-based aminosilane oligomer having an aminoalkyl group bonded to a silicon atom and having an alkyl group bonded to a silicon atom (hydrolyzed condensate of aminosilane compound). A polysiloxane backbone is contained as a main chain. Trade name: Dynasylan (trade name) HYDROSIL 2909, available from Evonik Industries AG. Aqueous solution, Solid content (net amount of silane coupling agent: the aminosilane oligomer described above): from 30 to 40 mass %. pH=approximately 4.

Compound 8: Water-based epoxysilane oligomer having a hydrolyzed epoxy group (condensate of epoxysilane). Trade name: Dynasylan (trade name) HYDROSIL 2926, available from Evonik Industries AG. Aqueous solution, Solid content (net amount of silane coupling agent: the epoxysilane oligomer described above): from 30 to 40 mass %. pH=approximately 3.

Compound 9: Alkoxysilyl compound having an epoxy group (2-(3,4-epoxycyclohexyl)ethyltrimethoxysilane). Trade name: KBM-303, available from Shin-Etsu Chemical Co., Ltd. Solid content: 100 mass %.

n-Hexane: Commercially available product.

IPA: Isopropanol, a commercially available product.

As is clear from the results shown in Tables 1, Comparative Example 1-1 and Comparative Example 2-1, in which the plasma-treated plastic was not wiped with the predetermined cleaning tool and used as is, exhibited low adhesion properties.

Comparative Example 1-2 and Comparative Example 2-2, in which the plasma-treated plastic was immersed in water, pulled-up from the water after the immersion, and dried in air, instead of being wiped with the cleaning tool, exhibited low adhesion properties.

Comparative Example 1-3, in which the composition for wiping contained no predetermined solvent but, instead, contained a non-polar solvent and contained no silane coupling agent, exhibited low adhesion properties.

Comparative Examples 1-4 to 8 and 2-3 to 7, in which the composition for wiping contained no predetermined solvent but, instead, contained a non-polar solvent, exhibited low adhesion properties.

On the other hand, the laminates having excellent adhesion properties were obtained by the production method according to embodiments of the present invention.

The invention claimed is:

1. A method for producing a laminate, the method comprising:
   a step 1 of dry-treating a surface A of a plastic to obtain a dry-treated plastic having a surface B that has been dry-treated;
   a step 2 of wiping the surface B with a cleaning tool containing a composition for wiping, the composition containing at least one solvent selected from the group consisting of water and polar solvents, and a silane coupling agent, to obtain a cleaned plastic having a surface C that has been wiped with the cleaning tool; and
   a step 3 of applying at least one selected from the group consisting of adhesives and primers on the surface C to obtain a laminate.

2. The method for producing a laminate according to claim 1, wherein the plastic is at least one selected from the group consisting of polyolefins, polyethylene terephthalates, polymethyl methacrylate resins, polycarbonate resins, polystyrene resins, acrylonitrile styrene copolymer resins, polyvinyl chloride resins, acetate resins, acrylonitrile butadiene styrene resins, polyester resins, and polyamide resins.

3. The method for producing a laminate according to claim 1, wherein the dry treatment is at least one selected from the group consisting of plasma treatment, corona treatment, flame treatment, ITRO treatment, ultraviolet treatment, and excimer treatment.

4. The method for producing a laminate according to claim 1, wherein, in the step 2, the surface B is wiped with the cleaning tool by applying a force from 25 to 0.25 kPa to the surface B.

5. The method for producing a laminate according to claim 1, wherein the composition for wiping contains water as the solvent.

6. The method for producing a laminate according to claim 1, wherein the silane coupling agent is an amine-based silane coupling agent.

7. The method for producing a laminate according to claim 1, wherein
   the silane coupling agent is at least one selected from the group consisting of
   a silane compound having a hydrolyzable silyl group and an aliphatic hydrocarbon group having at least one selected from the group consisting of an amino group and an imino group,
   a hydrolyzed condensate of the silane compound, and
   an organic polymer-type silane coupling agent having a hydrolyzable silyl group and at least one selected from the group consisting of an amino group and an imino group and having an organic polymer as a main chain.

8. The method for producing a laminate according to claim 1, wherein the silane coupling agent is water soluble.

9. The method for producing a laminate according to claim 1, wherein a content of the silane coupling agent is from 0.01 to 30 mass % relative to a total amount of the composition for wiping.

10. The method for producing a laminate according to claim 1, wherein a wetting tension of the surface B is 39 mN/m or greater.

11. The method for producing a laminate according to claim 1, wherein a wetting tension of the surface C is 34 mN/m or greater.

12. The method for producing a laminate according to claim 1, wherein the wetting tension of the surface B is greater than 65 mN/m.

13. The method for producing a laminate according to claim 12, wherein the wetting tension of the surface C is greater than 45 mN/m.

* * * * *